United States Patent
Lu et al.

(10) Patent No.: US 10,347,900 B2
(45) Date of Patent: Jul. 9, 2019

(54) HIGH-VOLTAGE POSITIVE ELECTRODE MATERIAL FOR LITHIUM BATTERY AND PREPARATION METHOD THEREOF

(71) Applicant: Industrial Technology Research Institute, Hsinchu (TW)

(72) Inventors: Cheng-Zhang Lu, New Taipei (TW); Chi-Hsun Tsai, Miaoli County (TW); Shih-Chieh Liao, Taoyuan (TW); Jin-Ming Chen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/684,949

(22) Filed: Aug. 24, 2017

(65) Prior Publication Data

US 2018/0190970 A1 Jul. 5, 2018

(30) Foreign Application Priority Data

Dec. 30, 2016 (TW) .............................. 105144042 A

(51) Int. Cl.
| | |
|---|---|
| *H01M 4/04* | (2006.01) |
| *H01M 4/505* | (2010.01) |
| *H01M 10/056* | (2010.01) |
| *H01M 10/0525* | (2010.01) |
| *H01M 10/42* | (2006.01) |
| *C01B 25/45* | (2006.01) |

(52) U.S. Cl.
CPC .............. *H01M 4/04* (2013.01); *C01B 25/45* (2013.01); *H01M 4/505* (2013.01); *H01M 10/056* (2013.01); *H01M 10/0525* (2013.01); *H01M 10/4235* (2013.01); *H01M 2300/0028* (2013.01)

(58) Field of Classification Search
CPC .... H01M 4/04; H01M 4/505; H01M 10/0525; H01M 10/056; H01M 10/42; H01M 10/4235
See application file for complete search history.

(56) References Cited

U.S. PATENT DOCUMENTS

| | | | |
|---|---|---|---|
| 7,445,871 B2 | 11/2008 | Suh et al. | |
| 8,404,381 B2 * | 3/2013 | Jouanneau | ............ H01M 4/131 252/519.15 |

(Continued)

FOREIGN PATENT DOCUMENTS

| | | |
|---|---|---|
| CN | 102437323 | 5/2012 |
| CN | 104681806 | 6/2015 |
| CN | 105226269 | 1/2016 |
| TW | I392134 | 4/2013 |

(Continued)

OTHER PUBLICATIONS

S. R. Li et al.,"A Consideration of Electrolyte Additives for LiNi0.5Mn1.5O4/Li4Ti5O12 Li-Ion Cells", Journal of the Electrochemical Society, vol. 160, No. 11,Sep. 25, 2013, pp. A2014-A2020.

(Continued)

*Primary Examiner* — Karie O'Neill Apicella
(74) *Attorney, Agent, or Firm* — JCIPRNET

(57) ABSTRACT

A high-voltage positive electrode material for a lithium battery and a preparation method thereof are provided. The high-voltage positive electrode material for a lithium battery includes a material represented by the following formula (1):

$$LiNi_{0.5-x-y}Mn_{1.5-x-y}Mg_{3x}Cr_{2y}O_4 \qquad (1)$$

wherein x>0, y>0, and 0<3x+2y≤0.1.

3 Claims, 15 Drawing Sheets

(56) References Cited

U.S. PATENT DOCUMENTS

| | | |
|---|---|---|
| 9,099,738 B2 | 8/2015 | Blomgren et al. |
| 2011/0226986 A1 | 9/2011 | Wang et al. |
| 2013/0122373 A1* | 5/2013 | Tamura ................. H01M 4/485 429/221 |

FOREIGN PATENT DOCUMENTS

| | | |
|---|---|---|
| TW | I443888 | 7/2014 |
| TW | I560930 | 12/2016 |

OTHER PUBLICATIONS

S. R. Li et al.,"The Impact of Electrolyte Oxidation Products in LiNi0.5Mn1.5O4/Li4Ti5O12 Cells", Journal of the Electrochemical Society, vol. 160, No. 9,Jul. 10, 2013, pp. A1524-A1528.

Hochun Lee et al.,"SEI layer-forming additives for LiNi0.5Mn1.5O4/graphite 5 V Li-ion batteries", Electrochemistry Communications, vol. 9, Issue 4, Apr. 2007,pp. 801-806.

M. Kunduraci et al.,"The effect of particle size and morphology on the rate capability of 4.7 V LiMn1.5+δNi0.5-δO4 spinel lithium-ion battery cathodes",Electrochimica Acta, vol. 53, May 2008,pp. 4193-4199.

Taejin Hwang et al.,"Surface-modified carbon nanotube coating on high-voltage LiNi0.5Mn1.5O4 cathodes for lithium ion batteries",Journal of Power Sources, vol. 322,Aug. 1, 2016, pp. 40-48.

Sébastien Patoux et al.,"High voltage spinel oxides for Li-ion batteries: From the material research to the application", Journal of Power Sources, vol. 189, Issue 1, 2008, pp. 344-352.

"Office Action of Taiwan Counterpart Application," dated Oct. 3, 2017, p. 1-p. 9.

\* cited by examiner

HIGH-VOLTAGE POSITIVE ELECTRODE MATERIAL FOR LITHIUM BATTERY AND PREPARATION METHOD THEREOF

CROSS-REFERENCE TO RELATED APPLICATION

This application claims the priority benefit of Taiwan application no. 105144042 filed on Dec. 30, 2016. The entirety of the above-mentioned patent applications is hereby incorporated by reference herein and made a part of this specification.

TECHNICAL FIELD

The disclosure relates to a lithium battery technique, and more particularly, to a high-voltage positive electrode material for a lithium battery and a preparation method thereof.

BACKGROUND

The energy density of a lithium battery is related to the operating voltage thereof, and therefore the development of a 5 V high-voltage positive electrode material is quite beneficial for increasing energy density. $LiNi_{0.5}Mn_{1.5}O_4$ has properties such as high operating voltage (about 4.7 V), high energy density, long cycle life, and resistance to high-rate charge and discharge, and therefore meets the energy density requirement above. However, the capacity of such material is degraded due to factors such as dissolution of manganese, Jahn-Teller distortion, and gas generation, and therefore such material currently cannot be readily commercialized.

Therefore, a positive electrode material for a high-voltage lithium battery having the effects of high operating voltage, high energy density, long cycle life, resistance to high-rate charge and discharge, and a more stable structure is urgently needed.

SUMMARY

In one embodiment of the disclosure, a high-voltage positive electrode material for a lithium battery includes a material represented by the following formula (1):

$$LiNi_{0.5-x-y}Mn_{1.5-x-y}Mg_{3x}Cr_{2y}O_4 \qquad (1)$$

wherein x>0, y>0, and 0<3x+2y≤0.1.

In another embodiment of the disclosure, a preparation method of a high-voltage positive electrode material for a lithium battery includes preparing a precursor using a coprecipitation method and then mixing and sintering the precursor and lithium salt to produce the material represented by formula (1) above. The precursor includes nickel (Ni), manganese (Mn), magnesium (Mg), and chromium (Cr).

To make the aforementioned more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The disclosure relates to a high-voltage positive electrode material for a lithium battery including a material represented by the following formula (1):

$$LiNi_{0.5-x-y}Mn_{1.5-x-y}Mg_{3x}Cr_{2y}O_4 \quad (1)$$

wherein x>0, y>0, and 0<3x+2y≤0.1.

In the disclosure, the "high-voltage" positive electrode material refers to a working voltage of 4.6 V or more and a charge cutoff voltage of 5V or more.

In an embodiment, Mn in formula (1) is Mn(IV), i.e. Mn(4+). Moreover, the material is, for instance, spherical particles consisted of nanoparticles, wherein a size of the nanoparticle is between about 100 nm and 800 nm, and the material is actually sub-micron level, such as an average particle size between 1 micron and 20 microns.

Figure 1:
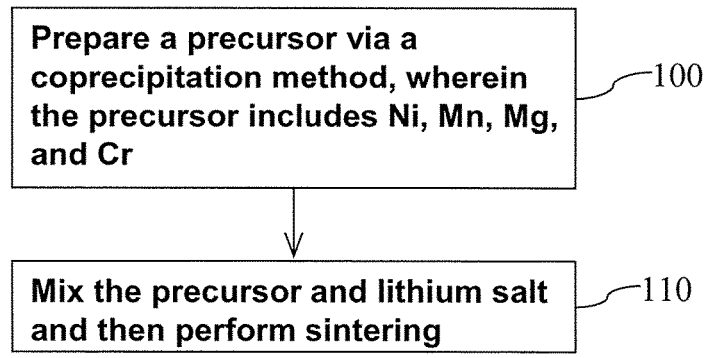
FIG. 1 shows the steps of the preparation process of a high-voltage positive electrode material for a lithium battery according to an embodiment of the disclosure.

FIG. 1 shows the steps of the preparation process of a high-voltage positive electrode material for a lithium battery according to an embodiment of the disclosure.

In FIG. 1, step 100 is performed to prepare a precursor using a coprecipitation method, wherein the precursor includes nickel (Ni), manganese (Mn), magnesium (Mg), and chromium (Cr). In the present embodiment, the coprecipitation method can include first preparing a metal solution based on the desired stoichiometry, then respectively selecting at least one chelating agent and at least one precipitant for preparation, and then controlling the reaction temperature, pH, feeding speed, stirring speed, and the presence of a protective atmosphere as needed to synthesize the desired precursor. The chelating agent is, for instance, ammonia water or ammonium sulfate, and the precipitant is, for instance, sodium hydroxide or potassium hydroxide. In an embodiment, the reaction temperature is, for instance, between 30° C. and 50° C., the pH is, for instance, 9 to 11, the feeding speed is, for instance, between 10 mL/H and 100 mL/H, and the stirring speed is, for instance, between 800 rpm and 2000 rpm. If a protective atmosphere is to be added in the coprecipitation method, then an inert gas can be used as the protective atmosphere. Moreover, the step of preparing the precursor requires various chemicals as the source of the metal elements; for instance, nickel nitrate, nickel sulfate, or nickel acetate can be used as the nickel source; manganese nitrate, manganese sulfate, or manganese acetate can be used as the manganese source; magnesium nitrate, magnesium sulfate, or magnesium acetate can be used as the magnesium source; and chromium nitrate, chromium sulfate, or chromium acetate can be used as the chromium source.

The positive electrode material of the present embodiment can prevent decomposition and release of oxygen atoms via the addition of transition metal magnesium having a greater bond energy with oxygen, and thus it can reduce Jahn-Teller distortion and reduce irreversible capacity. Moreover, chromium metal doping can increase the discharge capacity of a 5 V platform and inhibit the generation of $Mn^{3+}$ to slow down further reaction and decomposition with the electrolyte solution so as to improve battery performance, and therefore previous issues of the lithium nickel manganese oxide material can be solved.

Referring further to FIG. 1, in step 110, the precursor and lithium salt are mixed and then sintered to produce the material represented by formula (1) above, wherein the temperature for sintering is, for instance, between 600° C. and 800° C., the time for sintering is, for instance, between 8 hours and 24 hours, and the atmosphere for sintering can be air or oxygen. The oxygen during sintering is, for example, 99.99% pure oxygen, the air is, for example, general atmosphere, and the lithium salt is, for instance, lithium hydroxide or lithium carbonate.

In the following, experiments are provided to verify the effect of the positive electrode material for a lithium battery of the invention, but the disclosure is not limited to the following experiments.

<Raw Materials>

Nickel source: nickel sulfate.
Manganese source: manganese sulfate.
Magnesium source: magnesium sulfate.
Chromium source: chromium sulfate.
Chelating agent: ammonia water, ammonium sulfate.
Precipitant: sodium hydroxide.
Lithium salt: lithium carbonate.

The above are all purchased from Showa Corporation.

Preparation Example 1

31.39 g/L of the nickel source, 62.23 g/L of the manganese source, 1.84 g/L of the magnesium source, and 1.95 g/L of the chromium source were made into a metal solution based on the desired stoichiometry, and then 839.51 g/L of ammonia water and 13.21 g/L of ammonium sulfate were respectively prepared as the chelating agent, and 46.59 g/L of sodium hydroxide was prepared as a precipitant, wherein the reaction temperature was 40° C., the pH was about 10.10, the feeding speed was about 40 mL/H, and the stirring speed was about 1500 rpm, and a desired precursor was synthesized in the present of a protective atmosphere (nitrogen).

Then, the precursor and the lithium salt were sufficiently mixed at a molar ratio of 1:1.05 and then sintered to produce a material: $LiNi_{0.48}Mn_{1.48}Mg_{0.03}Cr_{0.02}O_4$, wherein the sintering temperature was about 750° C., the time was about 24 hours, and the sintering atmosphere was air.

Figure 2:
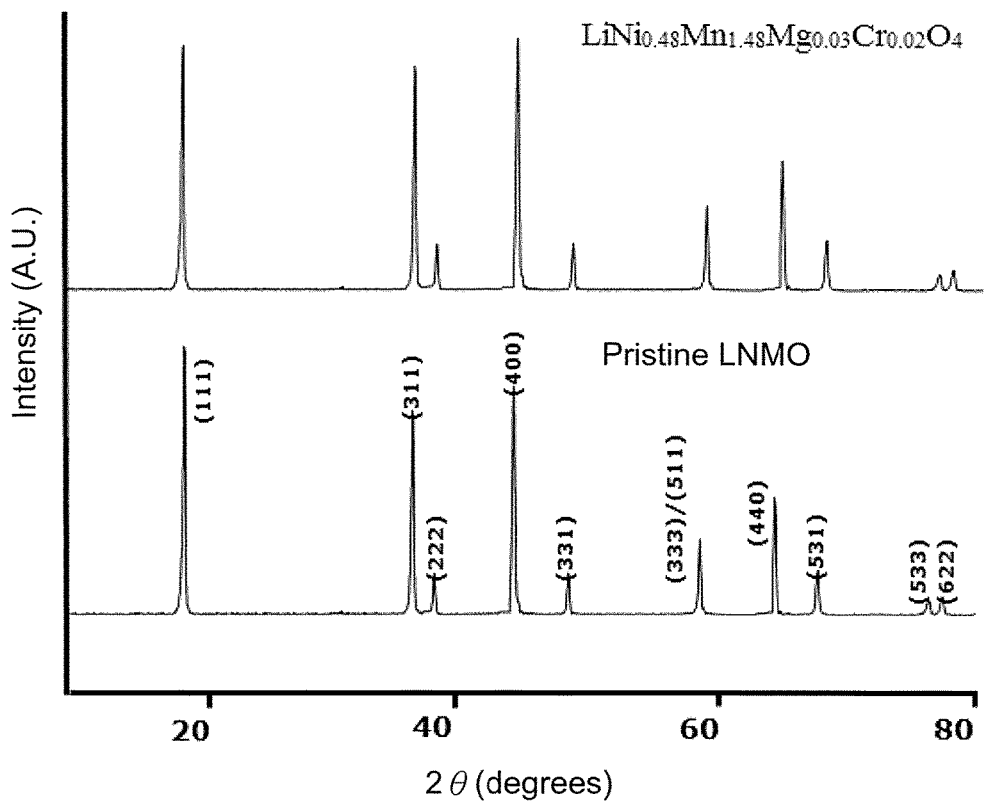
FIG. 2 is an XRD control chart of the high-voltage positive electrode material for a lithium battery of preparation example 1 and pristine lithium nickel manganese oxide (LNMO).
Figure 3:
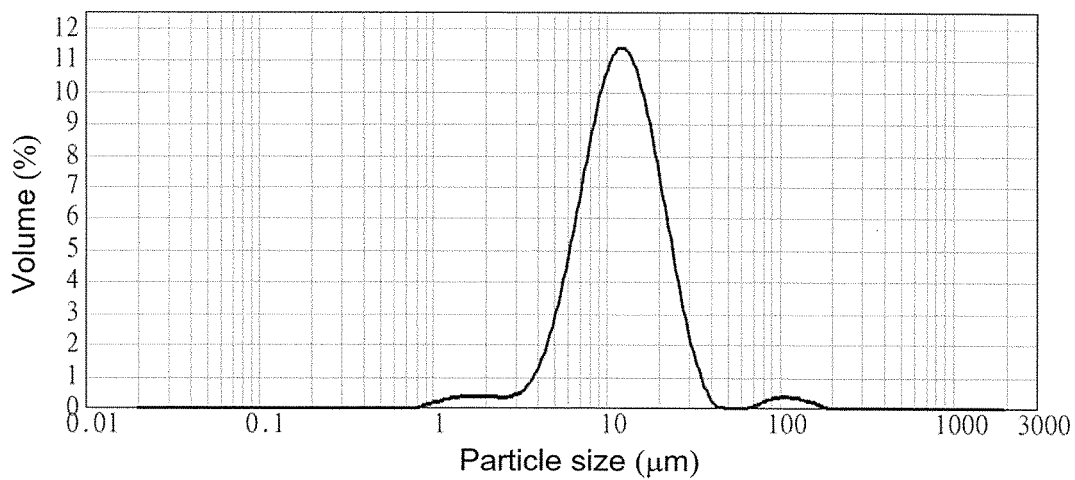
FIG. 3 is a particle size distribution curve of the high-voltage positive electrode material for a lithium battery of preparation example 1.

X-ray diffraction analysis (XRD) was performed on the product of preparation example 1, and the result was compared to the diffraction curve of pristine LNMO to obtain FIG. 2. It can be known from FIG. 2 that $LiNi_{0.48}Mn_{1.48}Mg_{0.03}Cr_{0.02}O_4$ of preparation example 1 does not change the crystal structure of LNMO. Moreover, the product of preparation example 1 was analyzed by dynamic light scattering (DLS), and the results are shown in FIG. 3. According to FIG. 3, the material of preparation example 1 has an average particle size ($D_{50}$) of about 12 microns.

Figure 4:
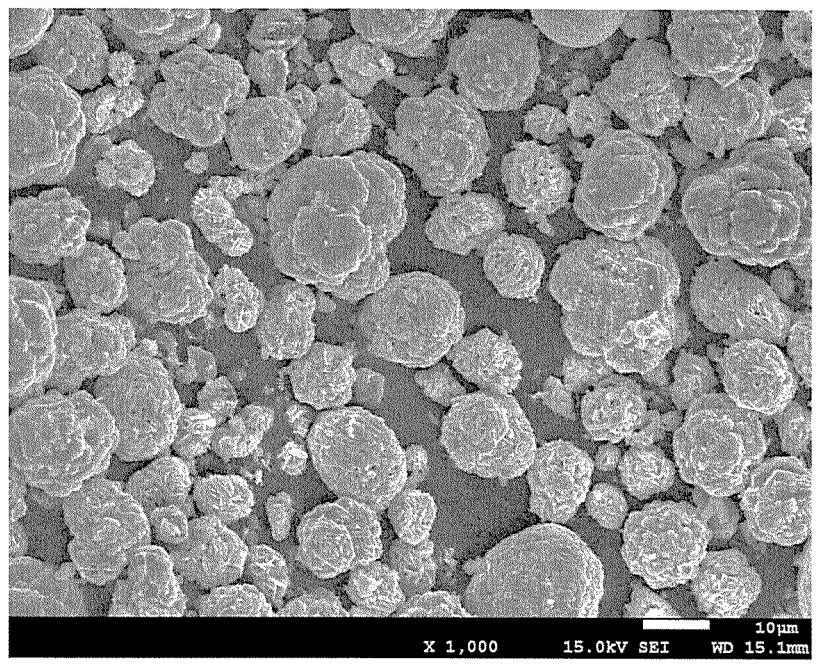
FIG. 4 is a 1,000-magnification SEM image of the high-voltage positive electrode material for a lithium battery of preparation example 1.
Figure 5:
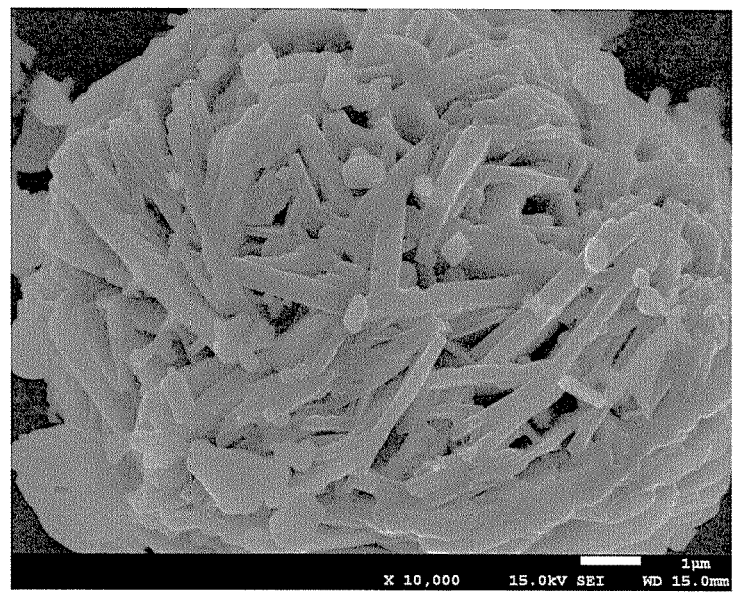
FIG. 5 is a 10,000-magnification SEM image of the high-voltage positive electrode material for a lithium battery of preparation example 1.
Figure 6A:
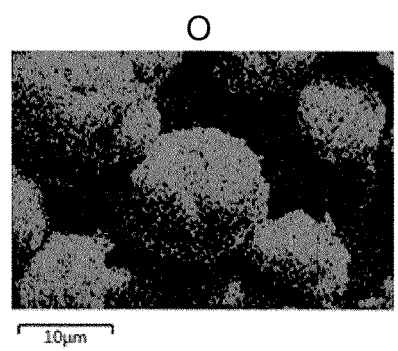
FIG. 6A is an O element map of the high-voltage positive electrode material for a lithium battery of preparation example 1.
Figure 6B:
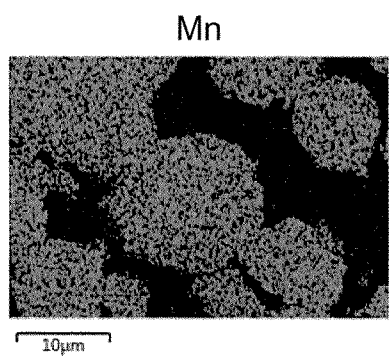
FIG. 6B is a Mn element map of the high-voltage positive electrode material for a lithium battery of preparation example 1.
Figure 6C:
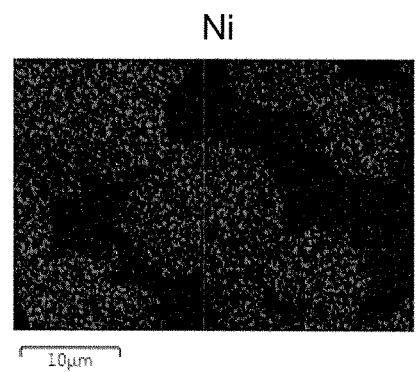
FIG. 6C is a Ni element map of the high-voltage positive electrode material for a lithium battery of preparation example 1.
Figure 6D:
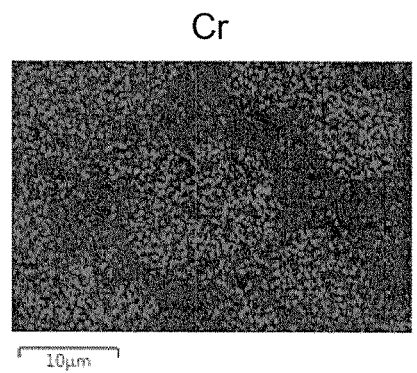
FIG. 6D is a Cr element map of the high-voltage positive electrode material for a lithium battery of preparation example 1.
Figure 6E:
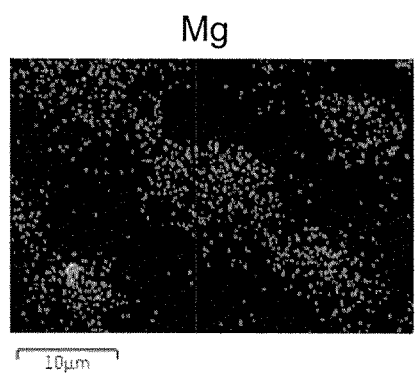
FIG. 6E is a Mg element map of the high-voltage positive electrode material for a lithium battery of preparation example 1.

Next, a scanning electron microscopy energy dispersive spectroscopy (SEM/EDS) analysis was performed on the product of preparation example 1 to obtain the SEM images of FIG. 4 and FIG. 5, wherein FIG. 4 is a 1,000-magnification SEM image and FIG. 5 is a 10,000-magnification SEM image. It can be observed from FIG. 4 that the particle size of the composite material is generally at the sub-micron level, and it can be observed from FIG. 5 that a single spherical microparticle is consisted of smaller nanoparticles. FIG. 6A to FIG. 6E are respectively O, Mn, Ni, Cr, and Mg element maps of the positive electrode material for a lithium battery of preparation example 1, wherein the bright regions (or bright spots) are locations of a single element, and the dark regions are locations of other elements. Therefore, it can be seen from FIG. 6A to FIG. 6E that the analysis regions have a plurality of material particles, and at the same time, O, Mn, Ni, Cr, and Mg are present at the same locations, and therefore the particle can be confirmed to be a composite material of lithium-nickel-manganese-chromium-magnesium oxide.

Comparative Example 1

Preparation was made according to the method of preparation example 1, but the LNMO material ($LiNi_{0.5}Mn_{1.5}O_4$) was not doped or modified.

Comparative Example 2

Preparation was made according to the method of preparation example 1, but magnesium was not doped. The resulting material was LNMO doped with 0.02 moles of chromium, and the formula thereof is $LiNi_{0.49}Mn_{1.49}Cr_{0.02}O_4$.

Comparative Example 3

Preparation was made according to the method of preparation example 1, but chromium was not doped. The resulting material was LNMO doped with 0.03 moles of magnesium, and the formula thereof is $LiNi_{0.49}Mn_{1.49}Mg_{0.03}O_4$.

Comparative Example 4

Preparation was made according to the method of preparation example 1, but Cr(III) was changed to Al(III) (aluminum sulfate). The resulting material was LNMO doped with 0.03 moles of magnesium and 0.02 moles of aluminum, and the formula thereof is $LiNi_{0.48}Mn_{1.48}Mg_{0.03}Al_{0.02}O_4$.

Comparative Example 5

Preparation was made according to the method of preparation example 1, but Mg(II) was changed to Zn(II) (zinc sulfate). The resulting material was LNMO doped with 0.03 moles of zinc and 0.02 moles of chromium, and the formula thereof is $LiNi_{0.48}Mn_{1.48}Zn_{0.03}Cr_{0.02}O_4$.

Comparative Example 6

Preparation was made according to the method of preparation example 1, and doping of Mg(II), Zn(II), Cr(III), and Al(III) was performed at the same time. The resulting material was LNMO doped with 0.015 moles of magnesium, 0.015 moles of zinc, 0.01 moles of chromium, and 0.01 moles of aluminum. The formula thereof is $LiNi_{0.48}Mn_{1.48}Mg_{0.0015}Zn_{0.0015}Cr_{0.01}Al_{0.01}O_4$.

<Analysis Method>

A 2032 button cell was used as the vehicle for the to-be-proven material, wherein the negative electrode was lithium metal, the electrolyte solution was 1.0 M $LiPF_6$, and EC/DMC=½ vol %.

Experimental Example 1

Figure 7A:
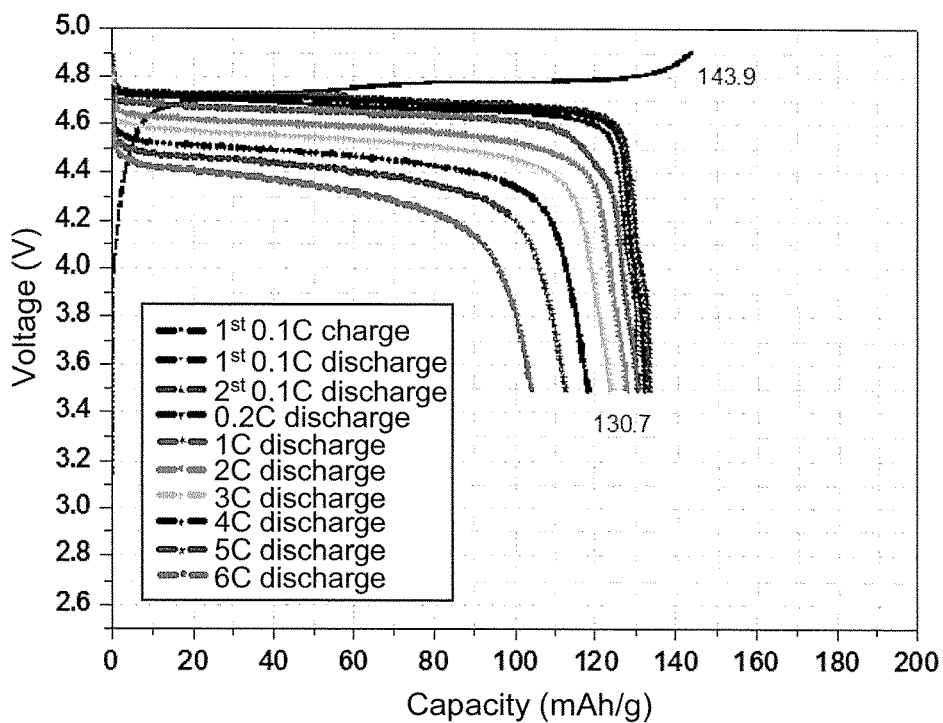
FIG. 7A is a capacity curve of the positive electrode material for a lithium battery of comparative example 1 obtained under different charge and discharge rates.
Figure 7B:
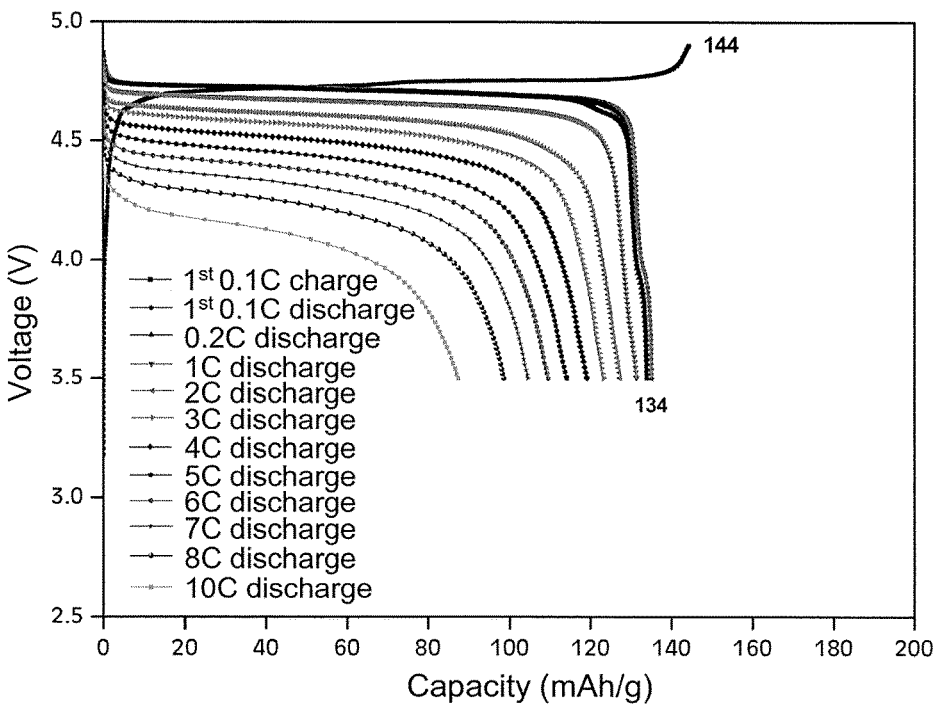
FIG. 7B is a capacity curve of the positive electrode material for a lithium battery of comparative example 2 obtained under different charge and discharge rates.
Figure 7C:
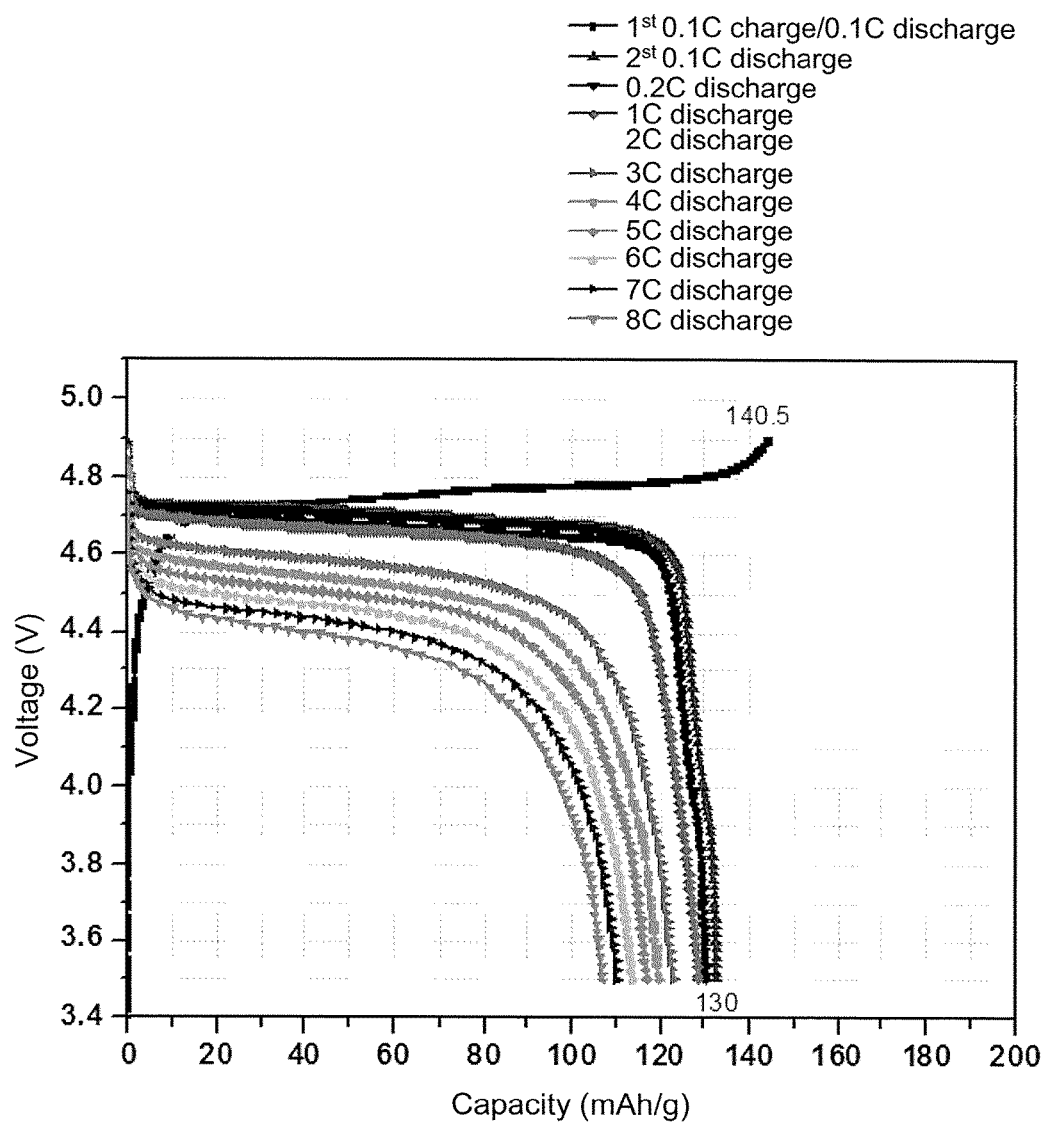
FIG. 7C is a capacity curve of the positive electrode material for a lithium battery of comparative example 3 obtained under different charge and discharge rates.
Figure 7D:
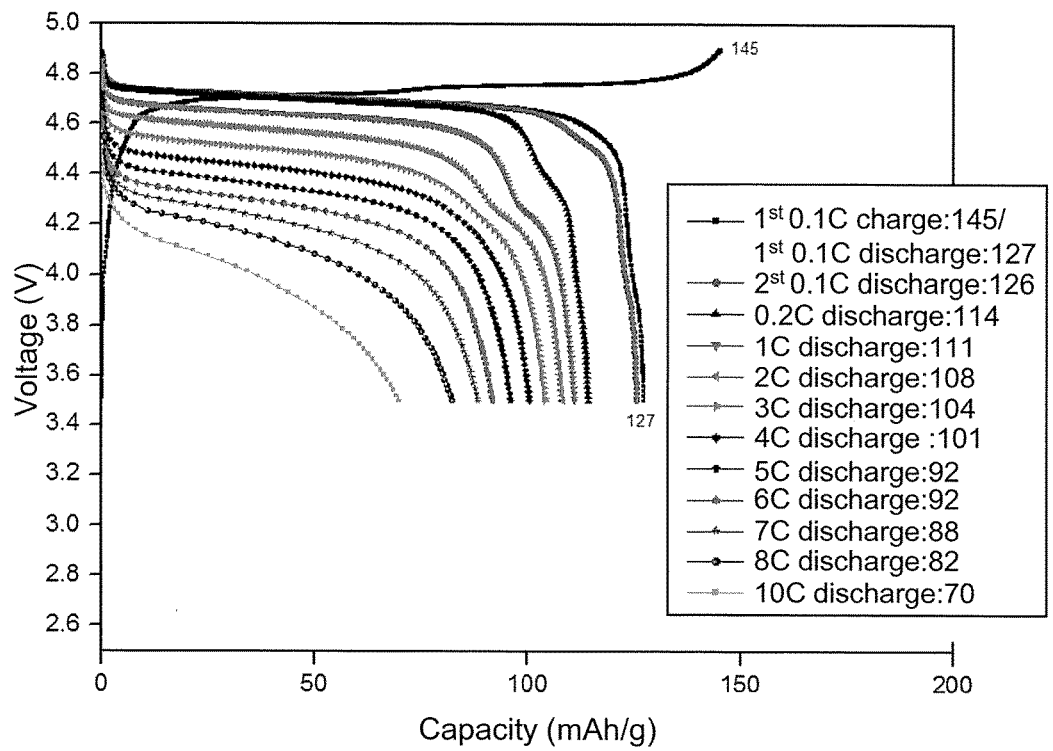
FIG. 7D is a capacity curve of the positive electrode material for a lithium battery of comparative example 4 obtained under different charge and discharge rates.
Figure 7E:
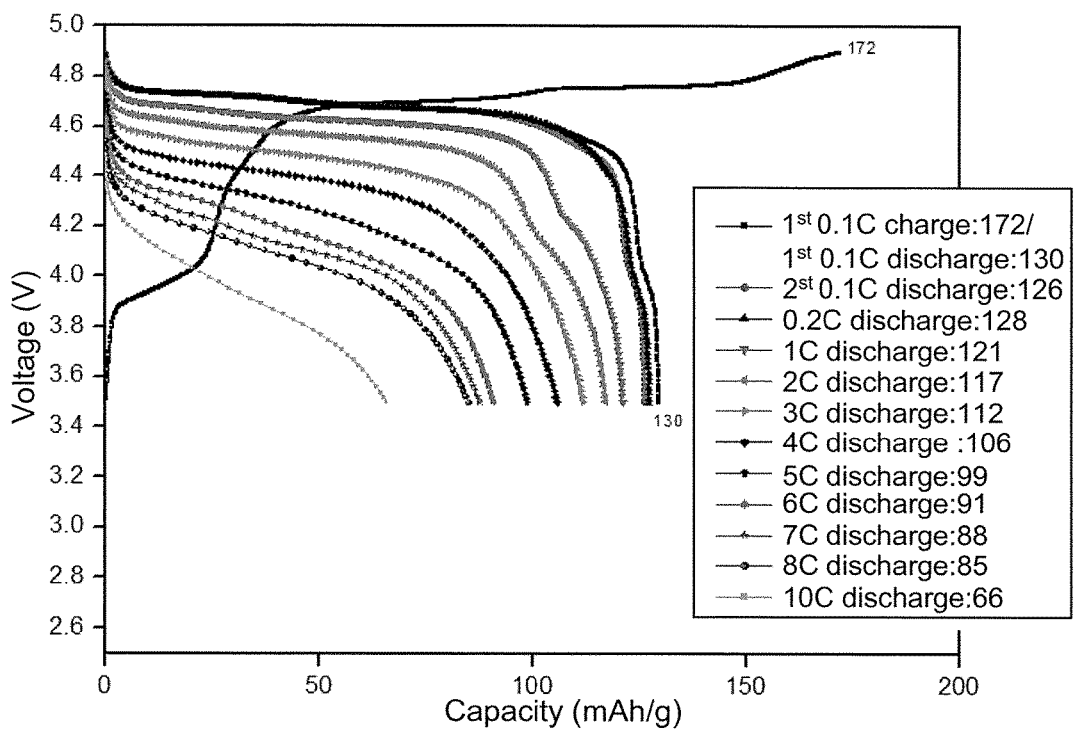
FIG. 7E is a capacity curve of the positive electrode material for a lithium battery of comparative example 5 obtained under different charge and discharge rates.
Figure 7F:
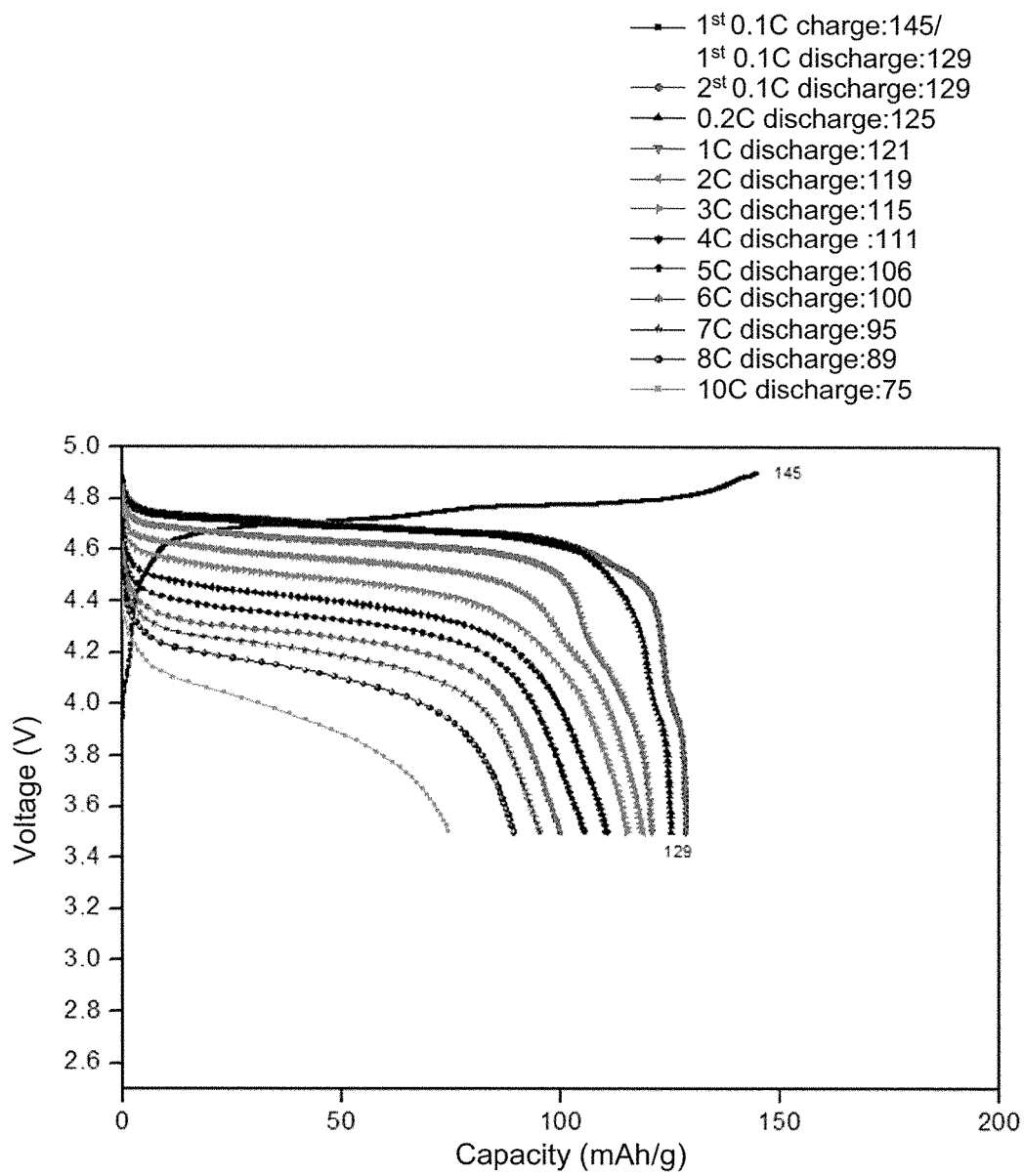
FIG. 7F is a capacity curve of the positive electrode material for a lithium battery of comparative example 6 obtained under different charge and discharge rates.
Figure 7G:
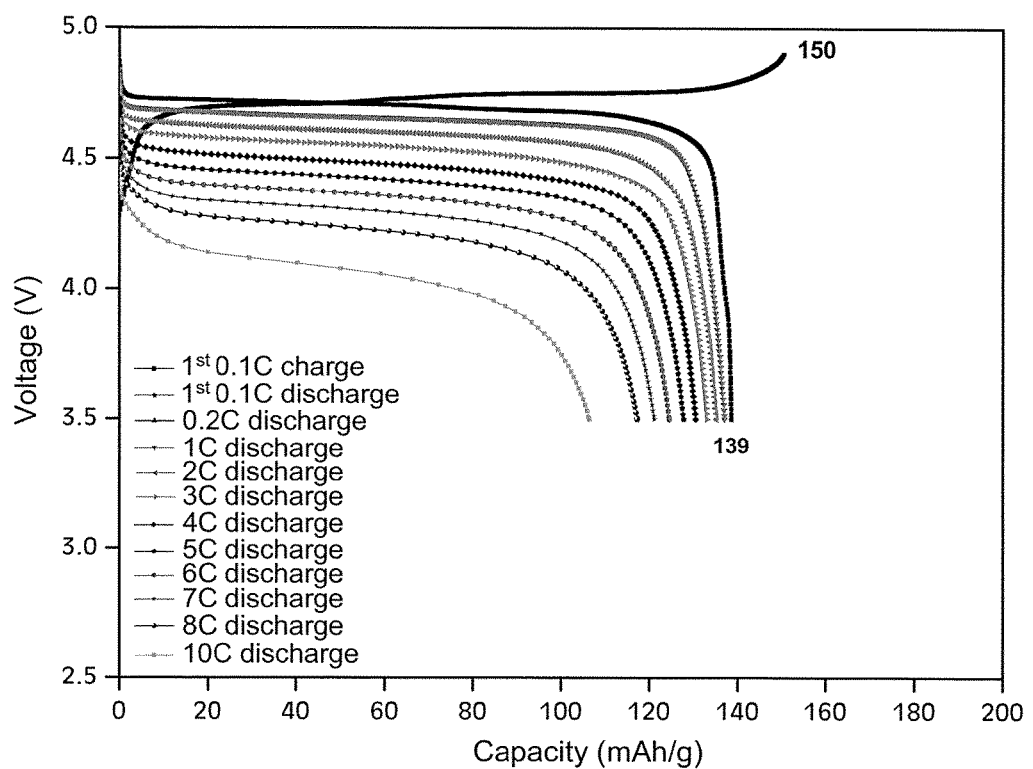
FIG. 7G is a capacity curve of the high-voltage positive electrode material for a lithium battery of preparation example 1 obtained under different charge and discharge rates.

A charge and discharge test was performed on batteries with the lithium battery positive electrode materials of comparative examples 1 to 6 and preparation example 1 at different charge and discharge rates and room temperature, and the results are respectively shown in FIG. 7A to FIG. 7G. FIG. 7A to FIG. 7F are capacity curves of comparative examples 1 to 6 obtained at different charge and discharge rates, and FIG. 7G is a capacity curve of preparation example 1 obtained at different charge and discharge rates. Capacities at 6 C were respectively compared, the maximum capacity was the battery using the positive electrode material of preparation example 1. Under the same 6 C discharge rate, the discharge capacities of FIG. 7A to FIG. 7G were respectively 104.07 mAh/g, 110 mAh/g, 113.63 mAh/g, 92 mAh/g, 91 mAh/g, 100 mAh/g, and 125 mAh/g. All of the capacity curves are shifted more downward and to the left with higher discharge rates. Moreover, in comparative example 4 in which chromium is replaced by other metal elements, the capacity cannot be effectively increased; in comparative example 5 in which magnesium is replaced by other metal elements, the capacity cannot be effectively increased.

Preparation Example 2

Preparation was made according to the method of preparation example 1, but the mole content of magnesium was reduced to 0.01 moles. The resulting material was $LiNi_{0.4866}Mn_{1.4867}Mg_{0.01}Cr_{0.02}O_4$.

Preparation Example 3

Preparation was made according to the method of preparation example 1, but the mole content of magnesium was reduced to 0.02 moles. The resulting material was $LiNi_{0.4834}Mn_{1.4833}Mg_{0.02}Cr_{0.02}O_4$.

Preparation Example 4

Preparation was made according to the method of preparation example 1, but the mole content of magnesium was increased to 0.05 moles. The resulting material was $LiNi_{0.47}Mn_{1.47}Mg_{0.05}Cr_{0.02}O_4$.

Experimental Example 2

Figure 8A:
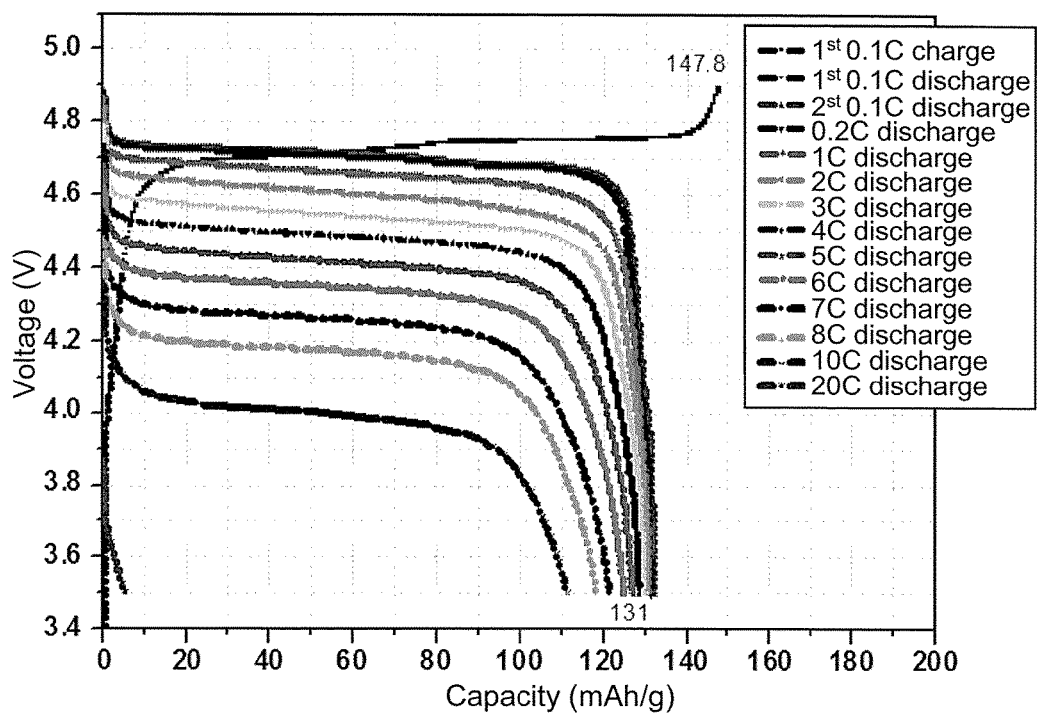
FIG. 8A is a capacity curve of the high-voltage positive electrode material for a lithium battery of preparation example 2 obtained under different charge and discharge rates.
Figure 8B:
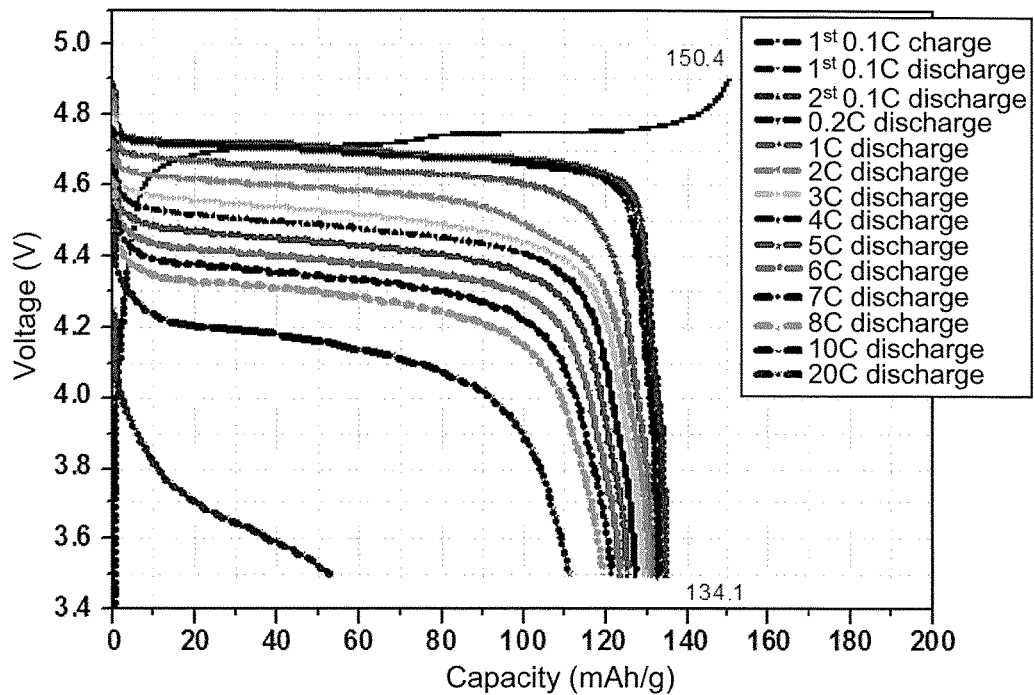
FIG. 8B is a capacity curve of the high-voltage positive electrode material for a lithium battery of preparation example 3 obtained under different charge and discharge rates.
Figure 8C:
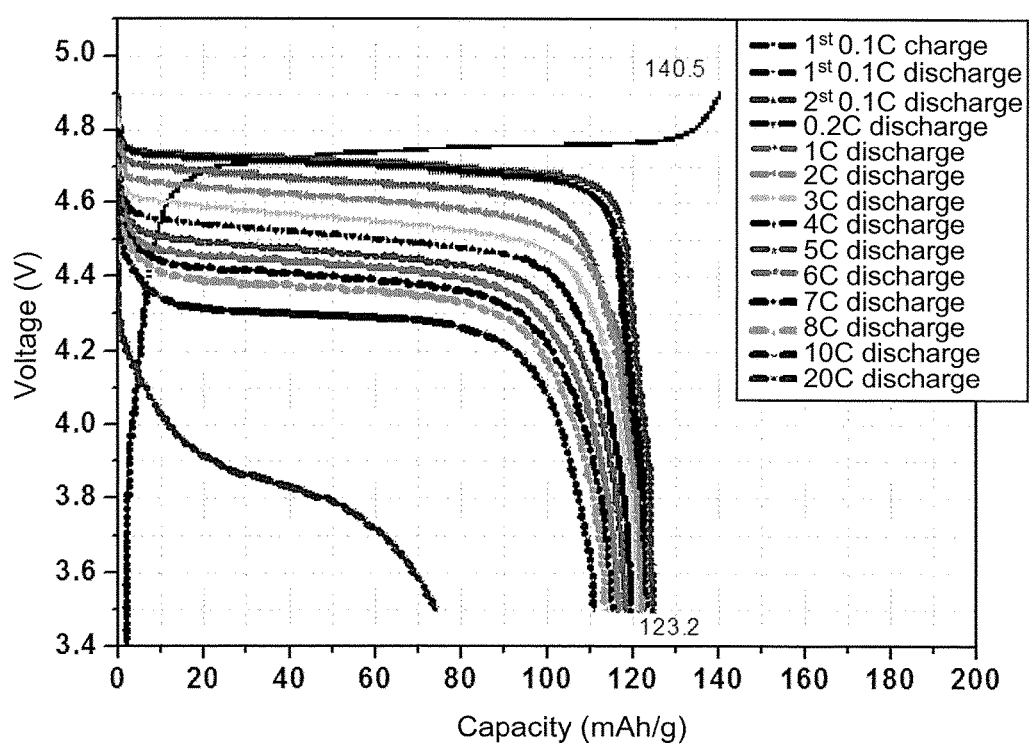
FIG. 8C is a capacity curve of the high-voltage positive electrode material for a lithium battery of preparation example 4 obtained under different charge and discharge rates.

A charge and discharge test was performed on batteries using the lithium battery positive electrode materials of preparation examples 2 to 4 at different charge and discharge rates and room temperature, and the results are respectively shown in FIG. 8A to FIG. 8C. It can be obtained from FIG. 8A to FIG. 8C that, batteries using the positive electrode materials for a lithium battery of preparation examples 2 to 4 can have higher capacity at high charge and discharge rates.

Experimental Example 3

Figure 9A:
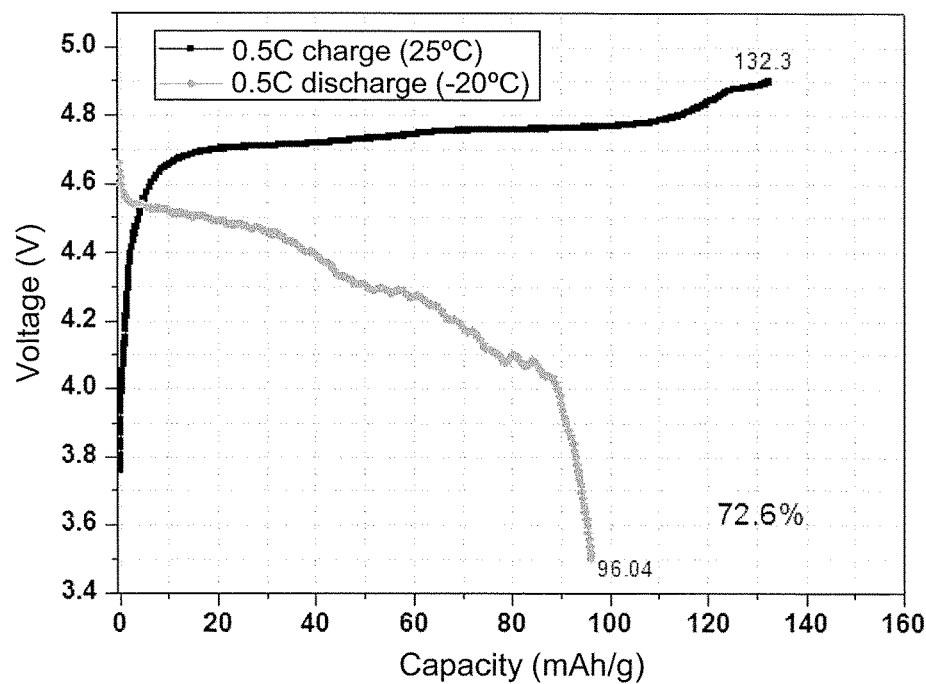
FIG. 9A is a capacity curve of the positive electrode material for a lithium battery of comparative example 1 at low temperature.
Figure 9B:
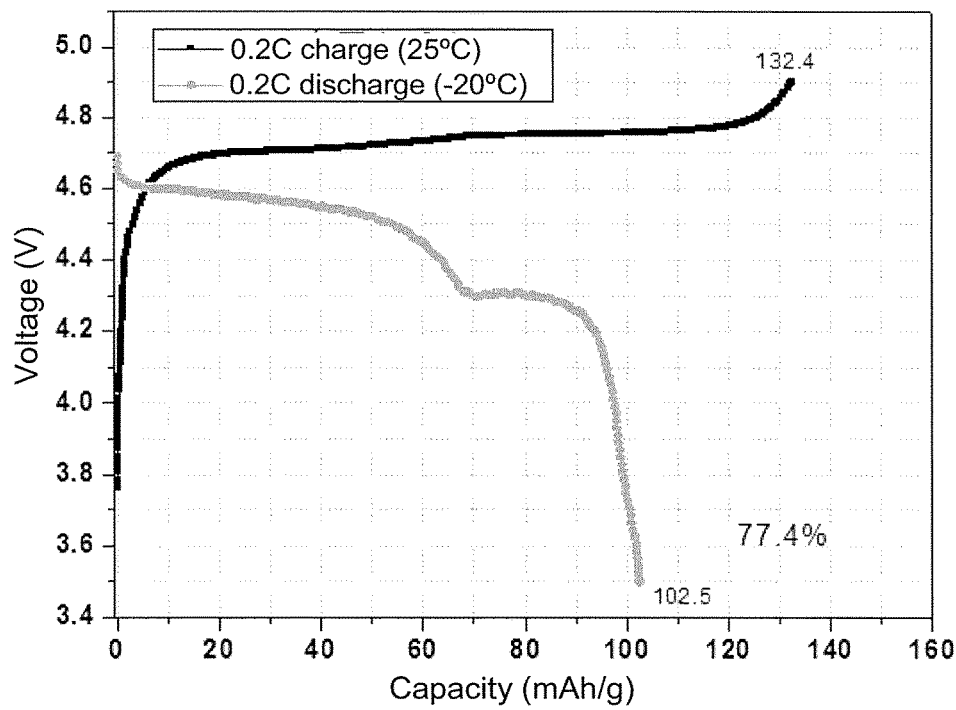
FIG. 9B is a capacity curve of the positive electrode material for a lithium battery of comparative example 2 at low temperature.
Figure 9C:
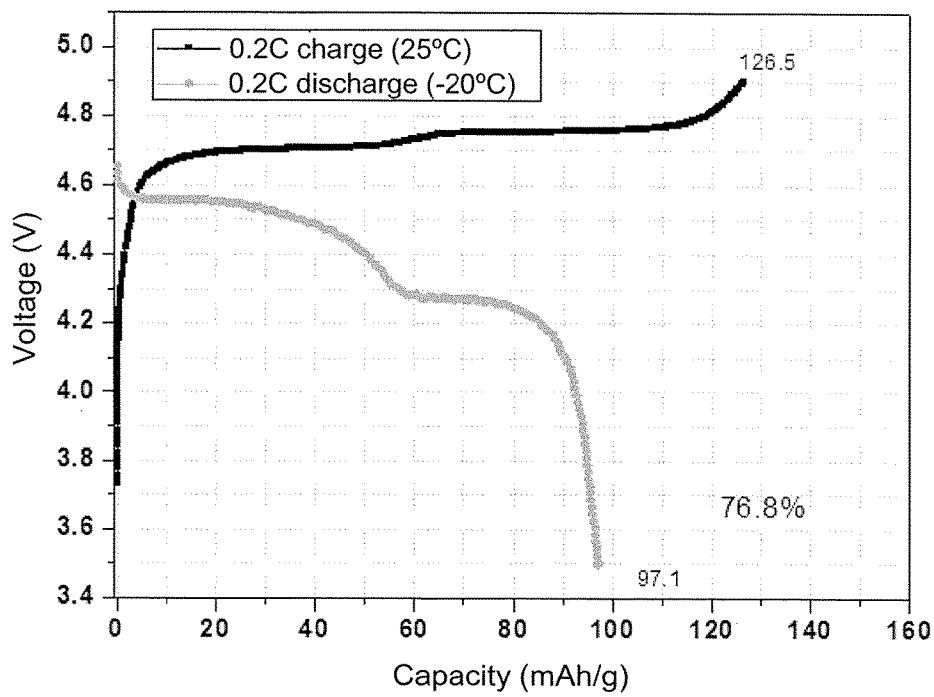
FIG. 9C is a capacity curve of the positive electrode material for a lithium battery of comparative example 3 at low temperature.
Figure 9D:
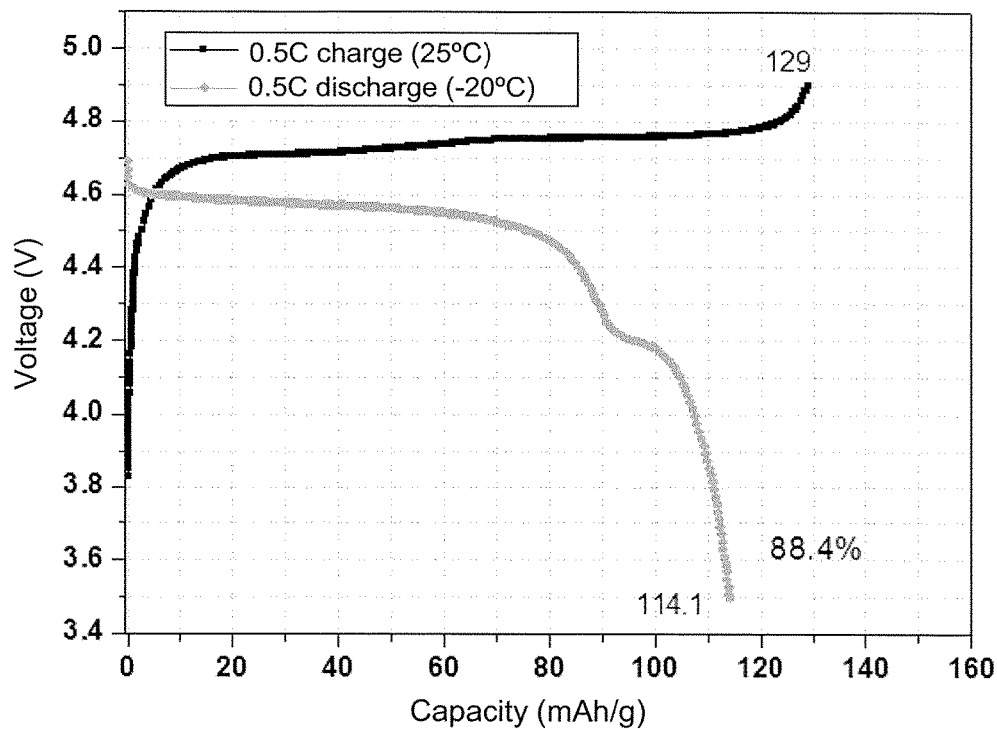
FIG. 9D is a capacity curve of the high-voltage positive electrode material for a lithium battery of preparation example 1 at low temperature.

At a low temperature of −20° C., a charge and discharge test was performed on the batteries using the lithium battery positive electrode material of comparative example 1 and preparation example 1 at 0.5 C; and a charge and discharge test was performed on the batteries using the lithium battery positive electrode material of comparative examples 2 to 3 at 0.2 C. The results are respectively shown in FIG. 9A to FIG. 9D, wherein FIG. 9A to FIG. 9C are capacity curves of comparative examples 1 to 3 obtained at low temperature; and FIG. 9D is a capacity curve of preparation example 1 obtained at low temperature. Charge and discharge capacity ratios are shown in the figures, wherein the ratio of preparation example 1 reaches 88.4% and is significantly better than the results of comparative examples 1 to 3. In particular, under the test condition that the discharge rate (0.5 C) of preparation example 1 is higher than the discharge rate (0.2 C) of both comparative examples 2 to 3, the low-temperature discharge property of preparation example 1 is still better than those of the comparative examples above.

Experimental Example 4

Figure 10A:
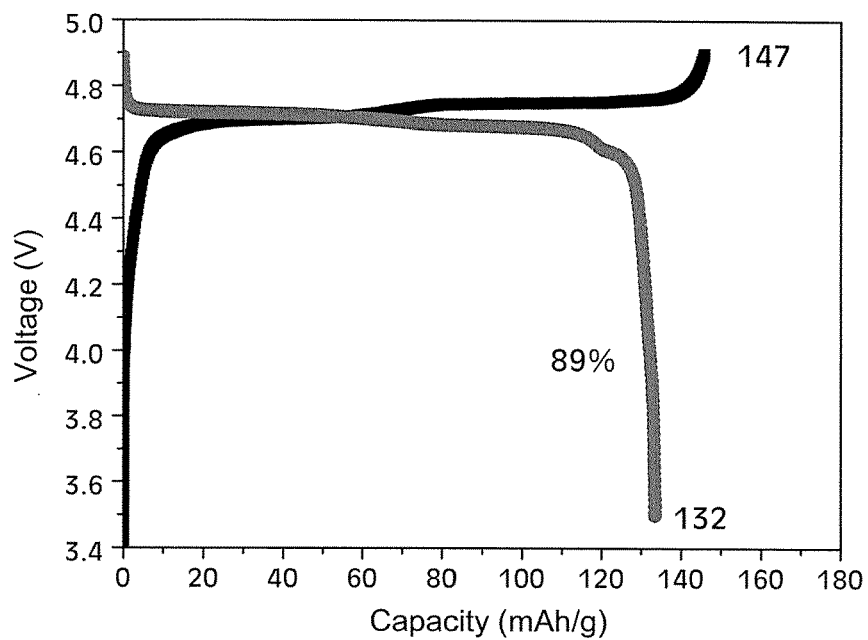
FIG. 10A is a capacity curve of the positive electrode material for a lithium battery of comparative example 1 at 0.1 C at high temperature.
Figure 10B:
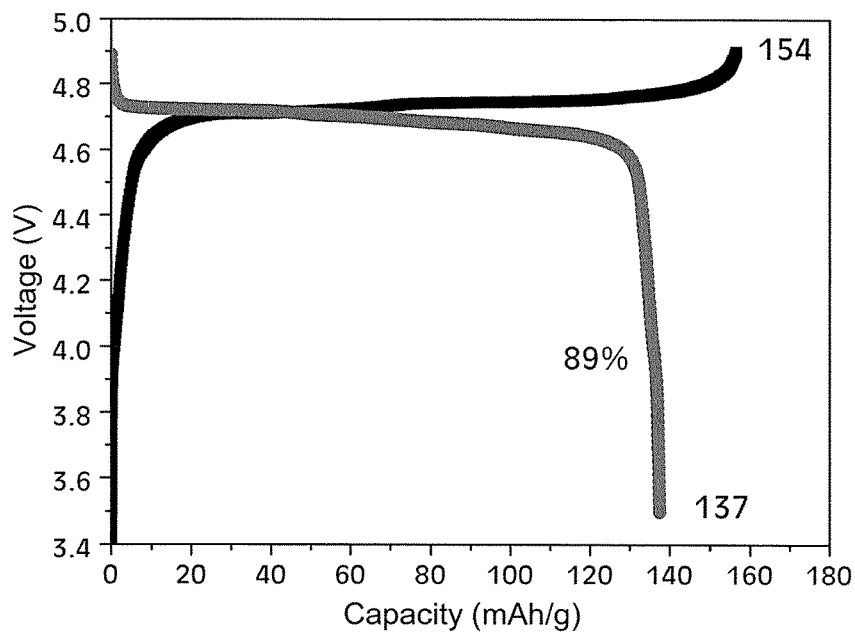
FIG. 10B is a capacity curve of the high-voltage positive electrode material for a lithium battery of preparation example 1 at 0.1 C at high temperature.

At a high temperature of 45° C., a charge and discharge test was performed on the batteries using the lithium battery positive electrode material of comparative example 1 and preparation example 1 at 0.1 C, and the results are respectively shown in FIG. 10A and FIG. 10B. It can be known from FIG. 10B that preparation example 1 has higher capacity.

Experimental Example 5

Figure 11A:
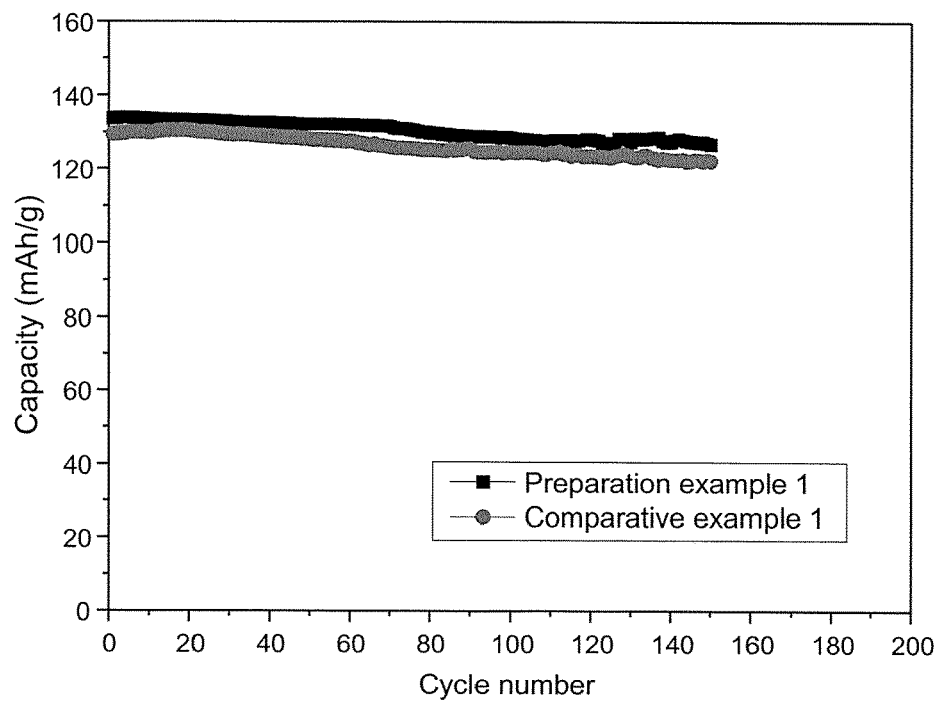
FIG. 11A is a cycle performance chart of preparation example 1 and comparative example 1 at room temperature.
Figure 11B:
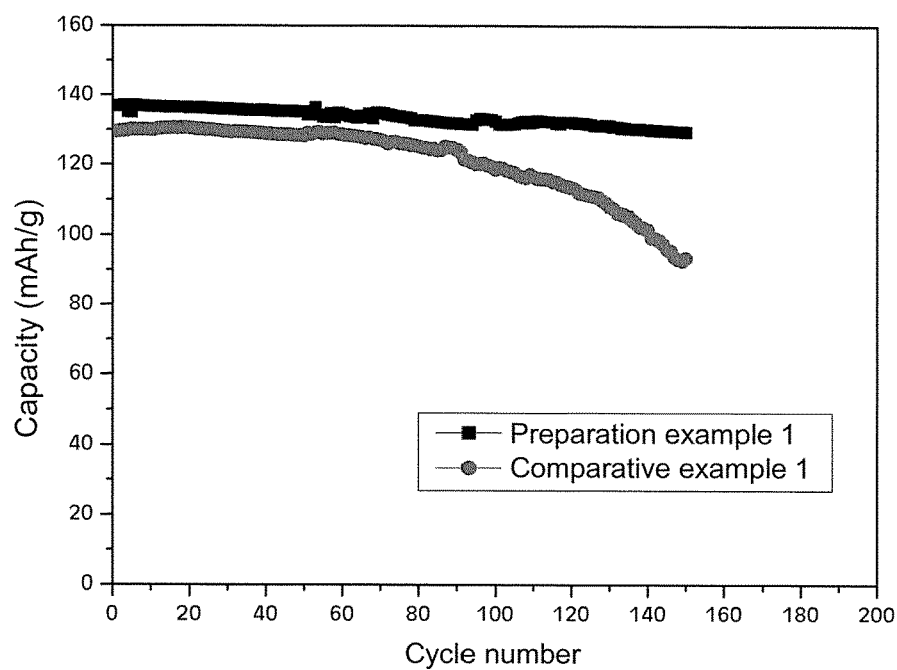
FIG. 11B is a cycle performance chart of preparation example 1 and comparative example 1 at high temperature.

At room temperature (about 25° C.) and a high temperature of 45° C., a charge and discharge cycle life test was respectively performed on the batteries using the lithium battery positive electrode material of comparative example 1 and preparation example 1 at 0.5 C, and the results are respectively shown in FIG. 11A and FIG. 11B. It can be known from FIG. 11B that, the battery using the lithium battery positive electrode material of preparation example 1 has a more stable charge and discharge performance at high temperature.

Based on the above, according to the addition of transition metal magnesium having a greater bond energy with oxygen, decomposition and release of oxygen atoms can be prevented, and therefore material cycle life property is improved. Moreover, in the disclosure, by doping chromium, discharge capacity of the 5 V platform can be increased and inhibit the production of $Mn^{3\pm}$ to slow down further reaction and decomposition with the electrolyte solution, such that battery performance is increased.

Accordingly, the material obtained in the disclosure not only can efficiently improve material reversible capacity, reduce irreversible capacity, and improve the performance of material at high-rate discharge, but also can significantly improve low-temperature discharge property of the material.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A high-voltage positive electrode material for a lithium battery, comprising a material represented in formula (1) below:

$$LiNi_{0.5-x-y}Mn_{1.5-x-y}Mg_{3x}Cr_{2y}O_4 \qquad (1)$$

wherein x>0, y>0, and 0<3x+2y≤0.1.

2. The high-voltage positive electrode material for the lithium battery of claim 1, wherein the Mn is Mn(IV).

3. The high-voltage positive electrode material for the lithium battery of claim 1, wherein an average particle size of the material is between 1 micron and 20 microns.

* * * * *